March 18, 1924. 1,487,182

W. H. RODEBUSH

APPARATUS FOR OBTAINING ALCOHOL.

Filed April 14, 1921  2 Sheets-Sheet 1

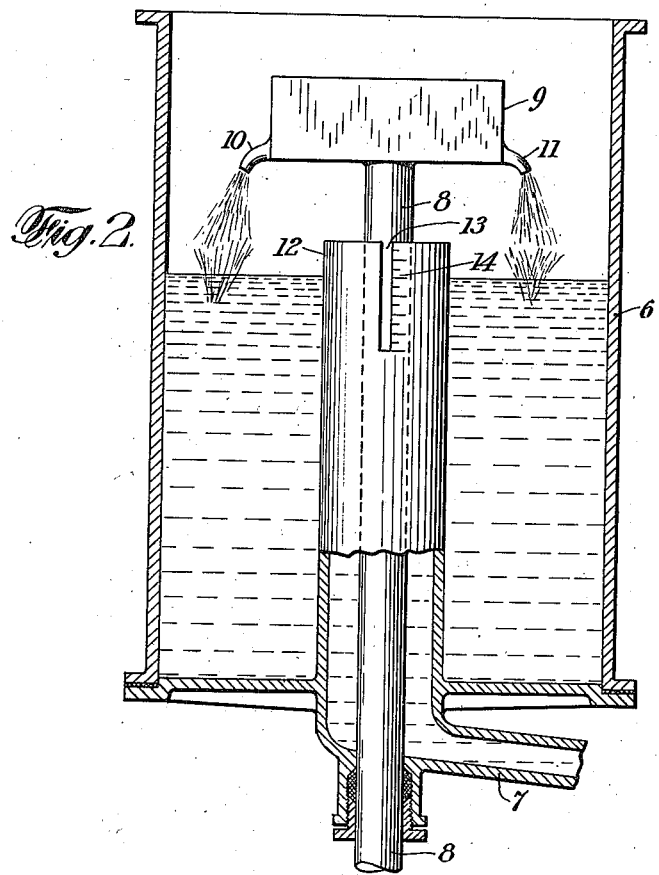
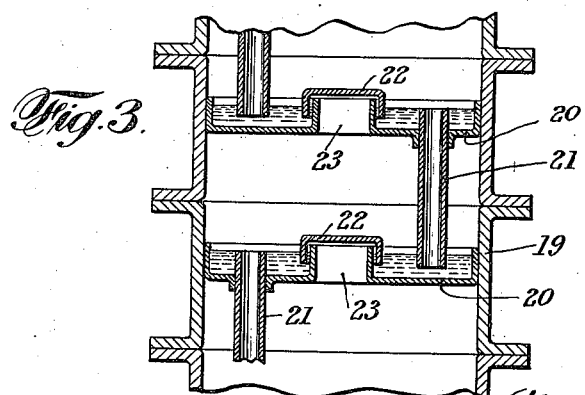

Patented Mar. 18, 1924.

1,487,182

UNITED STATES PATENT OFFICE.

WORTH H. RODEBUSH, OF BERKELEY, CALIFORNIA, ASSIGNOR TO U. S. INDUSTRIAL ALCOHOL CO., A CORPORATION OF WEST VIRGINIA.

APPARATUS FOR OBTAINING ALCOHOL.

Application filed April 14, 1921. Serial No. 461,303.

*To all whom it may concern:*

Be it known that I, WORTH H. RODEBUSH, a citizen of the United States, residing at Berkeley, in the county of Alameda and State of California, have invented certain new and useful Improvements in Apparatus for Obtaining Alcohols, Etc., of which the following is a specification.

My invention relates particularly to an apparatus designed for obtaining alcohols having a high strength and has especial reference to the production of absolute alcohol.

The object of my invention is to provide an apparatus by means of which alcohols having a high strength, that is to say above 95%, and particularly absolute alcohol, may be obtained.

A further object is to obtain this end by distilling an alcohol with a second liquid, as, for example, water, and a third constituent that is miscible with the alcohol but substantially immiscible with the second liquid, as, for example, ethyl acetate, thus obtaining a vapor mixture having different proportions of the constituents than the liquid being distilled and preferably so as to obtain, as a result of the distillation, a constant boiling mixture of the three liquids as well as an alcohol of a high strength.

Another object is to provide such an apparatus wherein the vapors evolved in the distillation may be condensed and separated into two immiscible liquids containing, respectively, high and low percentages of the third constitutent, as by the addition of a further quantity of the second liquid to the condensate.

Again, a further object is to distill these two liquids separately in such a manner as to obtain from one of them the third constituent, as a residue, of substantially 100% strength, as well as a condensate comprising said constant boiling mixture and from the other liquid a residue of water together with a condensate of said constant boiling mixture.

Further, the object of my invention is to provide a continuously operating apparatus in which the aforesaid distillations are conducted simultaneously while the distillates are collected together and separated continuously in the manner described.

Further objects of my invention will appear from the detailed description thereof contained hereinafter.

While my invention is capable of being carried out in many different ways, for the purpose of illustration I have shown only one way of carrying out the same in the accompanying drawings, in which:

Figure 2 is a vertical section of the measuring receptacle, and

Figure 3 is a section of one of the columns.

Figure 1:
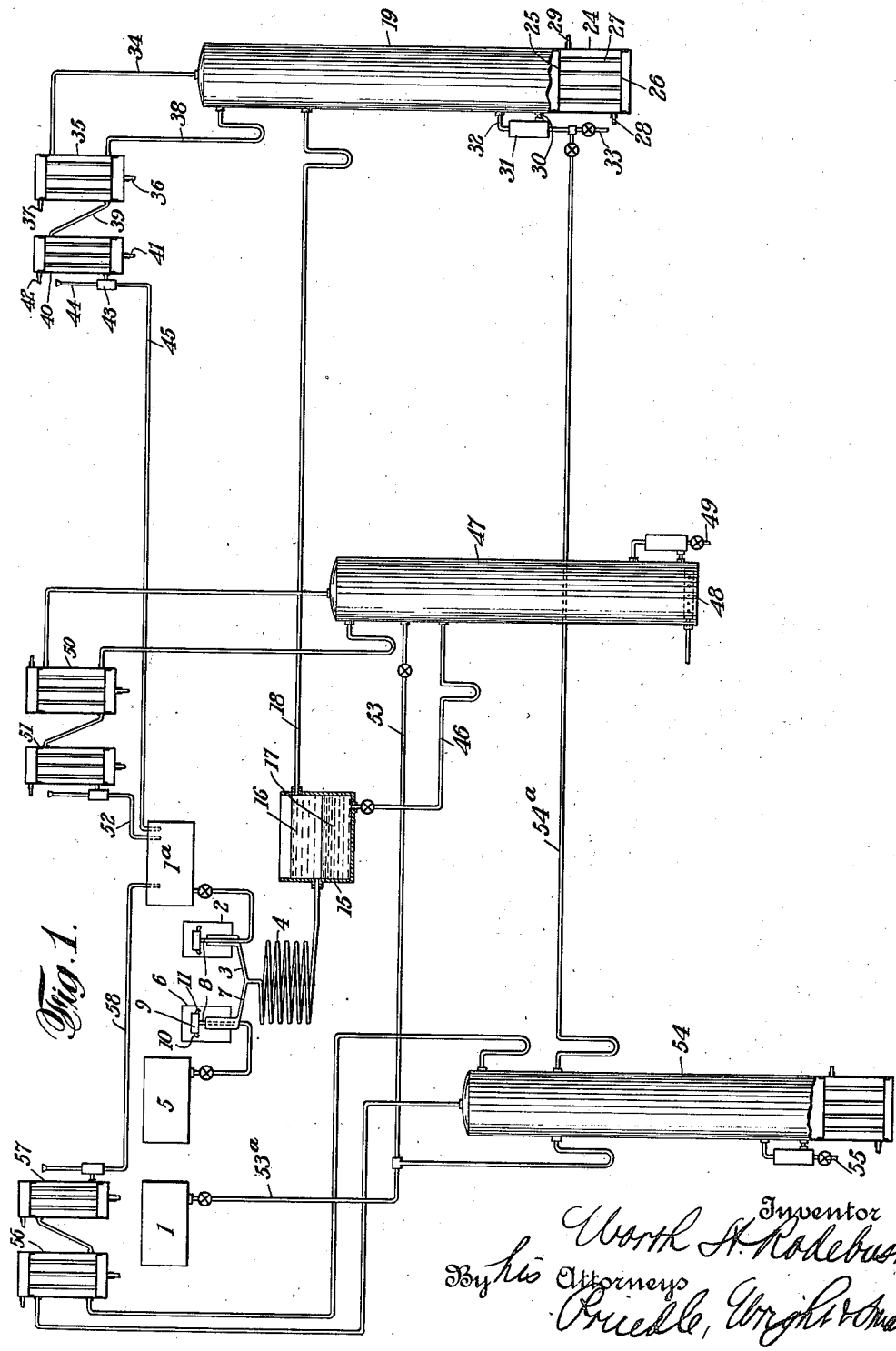
Figure 1 is a diagrammatic representation of an apparatus made in accordance with my invention.

For example, in carrying out my invention, assuming that the same is applied to the production of ethyl alcohol having a high strength, as, for example, absolute alcohol from alcohol having a lower strength, and incidentally ethyl acetate of 100% strength, 95% strength alcohol is continually fed into a reservoir 1, the feeding of the alcohol being begun as soon as a quantity of ethyl acetate which is supplied initially to a reservoir $1^a$, has passed through the apparatus so as to reach the alcohol fed into the same. The amount of the ethyl acetate introduced is such that at any given time the amounts of the ethyl acetate and 95% alcohol in the system are substantially equal. Thereafter, in the operation of the apparatus a constant boiling mixture comprising 83% ethyl acetate, 9% ethyl alcohol and 8% water, flows into the reservoir $1^a$ from the three inlet pipes shown in the drawings and thence into a measuring receptacle 2, and therefrom the mixture flows by a pipe 3 to a mixing coil 4, where the constant boiling mixture is brought into contact with a current of water fed from a water supply tank 5 to a measuring receptacle 6, and thence by a pipe 7 to said mixing coil 4. Each of the measuring receptacles 2 and 6 is comprised of a central inlet pipe 8 connected at the top to a container 9 having laterally directed feeding spouts 10 and 11 beneath which there is located a discharge cylinder 12 surrounding the inlet pipe 8, which cylinder 12 has near the top thereof a slot 13 to carry off the overflow from the measuring receptacle and indicate by the height of the outflowing liquid on a scale 14 at the edge of the slot 13 the rate of flow of the liquid from the measuring receptacle The rates of flow of the water and the constant boiling solution are regulated so that the volumes of the two liquids fed during a given interval of time are substantially equal. From the mixing coil 4 the liquids pass into a separating tank 15 where an upper layer 16 separates out containing 93% ethyl acetate, 5½% water and 1.5% alcohol, and where a lower layer 17 is formed containing 8% ethyl acetate, 86% water, and 6% ethyl alcohol. These percentages will vary, however, to a considerable extent. The upper layer 16 is drawn off by a pipe 18, and is fed thereby into the side of a column 19 made up of a plurality of pans 20 carrying liquid which overflows from each pan to the next pan below by a series of pipes 21, while the vapors are caused to pass through the bodies of liquid on the pans through liquid sealed bells 22 and pipes 23 leading into the same. Steam is provided for the column 19 by means of a heater 24 located at the bottom thereof comprising tube sheets 25 and 26 carrying tubes 27 and supplied with heating steam by inlet and outlet pipes 28 and 29. From the base of this column there is a drawoff pipe 30 for ethyl acetate having a strength of 100% which leads to a sight glass 31 having a vent pipe 32 leading back to the column 19, and an outlet pipe 33 leading from the bottom thereof. By means of the steam produced in the heater 24, the lower end of the column 19 is maintained at a temperature of substantially 77° C., while the top of said column is maintained at a temperature of approximately 71° C. From the top of the column 19, there is a vapor mixture containing ethyl acetate, water, and alcohol carried over, which is conveyed by a pipe 34 to a dephlegmator 35 cooled by a current of water passing through inlet and outlet pipes 36 and 37, and from which dephlegmator any condensed liquid passes back by a pipe 38 to the tower 19. From the dephlegmator 35, the uncondensed vapors of ethyl acetate, alcohol and water pass by a pipe 39 to a condenser 40, cooled by a current of water provided with the aid of inlet and outlet pipes 41 and 42, and from which the condensed liquid passes into a sight glass 43, having a vent 44 and a drawoff pipe 45. From this pipe 45, there is conveyed away a solution containing 83% ethyl acetate, 8% water, and 9% alcohol, which is discharged into the tank 1ª.

The lower layer of liquid 17 is conducted by a pipe 46 to the side of a second column 47 constructed the same as the column 19, except that there is an inlet pipe 48 at the bottom thereof provided with perforations to inject live steam instead of utilizing indirect heat. The steam thus injected maintains the lower end of the column 47 at a temperature of approximately 100° C., and the upper end of the column at a temperature of about 71° C. From the bottom of the column an outlet pipe 49 conveys away the water, and from the top of the column which is provided with a dephlegmator 50 and a condenser 51, constructed the same as in the case of the column 19, a discharge pipe 52 conveys away the condensed constant boiling solution comprising 83% ethyl acetate, 8% water, and 9% alcohol to the tank 1ª. Near the top of the column 47 where the temperature in the column is substantially 78° C., an outlet pipe 53 is provided for conveying away the excess ethyl alcohol having substantially a 95% strength to the side of a third column 54. The column 54 is constructed the same as the column 19 except that in addition to the inlet pipe 53, there is an inlet pipe 54ª communicating with the pipe 33, which leads from the lower end of the column 19, so as to convey the ester of 100% strength into the side of the column 54. Connected to the pipe 53, furthermore, there is an inlet pipe 53ª leading from the alcohol supply tank 1ª for the 95% alcohol which is continually supplied to the apparatus and which is to be converted into absolute alcohol. The lower end of this column 54 is maintained at a temperature of substantially 78° C., and the top of the tower is maintained at a temperature of about 71° C. From the lower end of this tower there is drawn off alcohol having a high strength, for example, absolute alcohol, by means of a pipe 55, and from the upper end of the tower which is provided with a dephlegmator 56 and a condenser 57, there is conveyed away by means of a pipe 58 a constant boiling solution containing 85% ethyl acetate, 8% water and 9% ethyl alcohol, which is discharged by said pipe into the tank 1ª.

The apparatus as thus constructed and operated will result in the production of absolute alcohol which is discharged by the pipe 55, ethyl acetate having a strength of 100% which may, if desired, be discharged from the pipe 33, and water which is discharged by the pipe 49.

It will be understood that the amount of ethyl acetate fed by the pipe 54ª into the side of the tower 54 will be controlled, so that the proportions of the absolute alcohol and water discharged from the apparatus will be substantially the same as the proportions of these constituents fed into the apparatus from the tanks 1 and 5.

It will be understood, also, that this apparatus may be conducted with other alcohols, such, for example, as propyl alcohol and another third constituent that is not soluble in water but is soluble in the alcohol such as benzol, or any other suitable material that may be used for this purpose. Where propyl alcohol is used propyl acetate could be the third constituent used therewith.

While I have described my invention above in detail, I wish it to be understood

I claim:

1. An apparatus for producing absolute alcohol comprising a combination of three column stills, a supply pipe for delivering liquid to the first still, a pipe from the third still to the first, a pipe from near the top of the second still leading to the first still, a condenser for each still, a liquid mixing device, a separating chamber connected thereto, a pipe from near the top of the third still to the separating chamber, a pipe from the separating chamber to the second still.

2. An apparatus for producing absolute alcohol comprising a combination of three column stills, a supply pipe connected to the first still near its top, a pipe leading from the bottom of the third still to the first still near its top, a pipe leading from near the top of the second still to the first still near its top, a condenser for each still, a liquid mixing device, a separating chamber connected thereto, a pipe leading from near the top of the third still to the top of the separating chamber, and a pipe from the bottom of the separating chamber to the upper part of the second still.

3. An apparatus comprising a column still, a condenser, a separating chamber for receiving a condensate from the evolved vapors, means for introducing into the separating chamber a further quantity of one of the constituents of the condensate to bring about the separation of the condensate into two immiscible liquids, a column still connected to receive one of said separated liquids, another column still for receiving the remaining one of the separated liquids, and means for conducting the condensates from the two last mentioned stills to the separating chamber.

4. An apparatus comprising an alcohol rectifier, an ester rectifier, means for feeding the ester from the ester rectifier to the alcohol rectifier, and means for feeding alcohol containing water into the alcohol rectifier.

5. An apparatus comprising an alcohol rectifier, an ester rectifier, means for feeding the ester from the ester rectifier to the alcohol rectifier, means for feeding alcohol containing water into the alcohol rectifier, and a third rectifier for producing the alcohol containing water.

6. An apparatus comprising a mixing apparatus for bringing together water and a mixture containing an alcohol, an ester, and water, a separating tank, an alcohol rectifier, an ester rectifier, means for feeding the ester from the ester rectifier to the alcohol rectifier, and means for feeding alcohol containing water into the alcohol rectifier, the ester rectifier being connected to the upper portion of the separating tank.

7. An apparatus comprising a mixing apparatus for bringing together water and a mixture containing an alcohol, an ester, and water, a separating tank, an alcohol rectifier, an ester rectifier, means for feeding the ester from the ester rectifier to the alcohol rectifier, means for feeding alcohol containing water into the alcohol rectifier, and a third rectifier for producing the alcohol containing water, the third rectifier being connected to the lower part of said separating tank.

8. An apparatus comprising a mixing apparatus for bringing together water and a mixture containing an alcohol, an ester, and water, a water supply for the mixing apparatus, a mixture supplying container for supplying the mixture of the ester, the alcohol, and water to the mixing apparatus, a separating tank, an alcohol rectifier, an ester rectifier, means for feeding the ester from the ester rectifier to the alcohol rectifier, and means for feeding alcohol containing water into the alcohol rectifier, the ester rectifier being connected to the upper portion of the separating tank, the vapor outlet ends of the rectifiers being connected to discharge the condensate into said mixture supplying container.

9. An apparatus comprising a mixing apparatus for bringing together water and a mixture containing an alcohol, an ester, and water, a water supply for the mixing apparatus, a mixture supplying container for supplying the mixture of the ester, the alcohol, and water to the mixing apparatus, a separating tank, an alcohol rectifier, an ester rectifier, means for feeding the ester from the ester rectifier to the alcohol rectifier, means for feeding alcohol containing water into the alcohol rectifier, and a third rectifier for producing the alcohol containing water, the third rectifier being connected to the lower part of said separating tank, the vapor outlet ends of the rectifiers being connected to discharge the condensates into said mixture supplying container.

In testimony that I claim the foregoing, I have hereunto set my hand this 5th day of April, 1921.

WORTH H. RODEBUSH.